US011335111B2

(12) United States Patent
Allen et al.

(10) Patent No.: US 11,335,111 B2
(45) Date of Patent: May 17, 2022

(54) OPTICAL CHARACTER RECOGNITION (OCR) INDUCTION FOR MULTI-PAGE CHANGES

(71) Applicant: INTERNATIONAL BUSINESS MACHINES CORPORATION, Armonk, NY (US)

(72) Inventors: Corville O. Allen, Morrisville, NC (US); Joseph Kozhaya, Morrisville, NC (US); Shikhar Kwatra, Raleigh, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 16/921,713

(22) Filed: Jul. 6, 2020

(65) Prior Publication Data

US 2022/0004755 A1    Jan. 6, 2022

(51) Int. Cl.
*G06V 30/414* (2022.01)
*G06K 9/62* (2022.01)
*H04N 1/047* (2006.01)
*G06V 10/98* (2022.01)
*G06V 30/10* (2022.01)

(52) U.S. Cl.
CPC ......... *G06V 30/414* (2022.01); *G06K 9/6256* (2013.01); *G06V 10/98* (2022.01); *H04N 1/047* (2013.01); *G06V 30/10* (2022.01)

(58) Field of Classification Search
CPC ...... G06V 30/10; G06V 30/414; G06V 10/98; G06K 9/6256; H04N 1/047
See application file for complete search history.

(56) References Cited

U.S. PATENT DOCUMENTS

| 4,895,466 | A  | 1/1990  | Hailman et al. |
| 5,781,773 | A  | 7/1998  | Vanderpool et al. |
| 5,850,480 | A  | 12/1998 | Scanlon |
| 7,792,362 | B2 | 9/2010  | Berkner et al. |
| 8,600,989 | B2 | 12/2013 | Hull et al. |

(Continued)

OTHER PUBLICATIONS

Schibilla, et al. (Computer English Translation of European Patent EP 1260912 A2), pp. 1-8. (Year: 2002).*

(Continued)

*Primary Examiner* — Daniel G Mariam
(74) *Attorney, Agent, or Firm* — Konrad Raynes Davda & Victor LLP; Janaki K. Davda

(57) ABSTRACT

Provided are techniques for OCR induction for multi-page changes. A plurality of documents of a document type are processed to generate text area data for a text area in one or more documents of the plurality of documents, where the text area data includes coordinate locations of a zone for the text area based on expansion and direction of shift of the text area. A page flow model is trained using the plurality of documents and the text area data. In response to receiving a new document comprising the text area, a scanning script is received from the page flow model, where the page flow model identifies a new zone for the text area in the new document and determines how to adjust another zone for an element in the new document. The scanning script is used to scan the new document to generate digital text.

18 Claims, 12 Drawing Sheets

(56) References Cited

U.S. PATENT DOCUMENTS

| | | |
|---|---|---|
| 2002/0181805 A1 | 12/2002 | Loeb et al. |
| 2015/0026558 A1 | 1/2015 | Dejean |
| 2018/0276462 A1 | 9/2018 | Davis et al. |
| 2021/0406337 A1* | 12/2021 | Frikha .................. G06N 20/00 |

OTHER PUBLICATIONS

IBM Corporation, "IBM Datacap", [online], [Retrieved on Jun. 5, 2020], Retrieved from the Internet at <URL: https://www.ibm.com/us-en/marketplace/data-capture-and-imaging>, 5 pp.

IBM Corporation, "Zone Actions", [online], Retrieved on Jun. 5, 2020], Retrieved from the Internet at <URL: i)https://www.ibm.com/support/knowledgecenter/en/SSZRWV_9.0.0/com.ibm.dc.develop.doc/dcadg649.htm>, 6 pp.

Mell et al., "Effectively and Securely Using the Cloud Computing Paradigm" dated Oct. 7, 2009, NIST, Information Technology Laboratory, 80 pp.

Mell et al., "The NIST Definition of Cloud Computing" dated Sep. 2011, Recommendations of the National Institute of Standards and Technology, 7 pp.

Pletschacher, S., et al., "Europeana Newspapers OCR Workflow Evaluation", Proceedings of the 3rd International Workshop on Historical Document Imaging and Processing, Aug. 2015, 8 pp.

Wikipedia, "Tesseract (Software)", [online], [Retrieved on Jun. 5, 2020], Retrieved from the Internet at <URL: https://en.wikipedia.org/wiki/Tesseract_(software)>, 5 pp.

* cited by examiner

| General Intake Form | |
|---|---|
| What is your name? | User A |
| What is your objective for joining the program? | I hope to accomplish many things in the time I spend in this program. |
| When can you start? | 6/20/19 |
| | |
| | |
| | |
| | |
| | |
| | |
| | |

220

| General Intake Form | |
|---|---|
| What is your name? | User B |
| What is your objective for joining the program? | There are many reasons for joining the program. I would like to add my expertise in different areas to the project. In addition, I would like to receive training to learn new techniques. Moreover, I would then apply the new techniques to other projects that I am working on and train my team members on these new techniques. |
| When can you start? | 7/20/19 |

```
{
"document":"form_123.pdf",
"scan_date":"05/21/2020",
"records":
  [
    {"field label": "What is your name?", "text value": "User A", "coordinate locations":"0,50,300,100", "extraction_confidence":0.95},
    {"field label": "What is your objective for joining the program?", "text value": "I hope to accomplish many things in the time I spend in this program", "coordinate locations":"0,100,300,400", "extraction_confidence":0.90},
    {"field label": "When can you start?", "text value": "6/20/19", "coordinate locations":"0,400,300,450", "extraction_confidence":0.99}
  ]
}
```
— 610

```
{
"document":"form_124.pdf",
"scan_date":" 05/22/2020",
"records":
[
{"field label": "What is your name?", "text value": "User B",
"coordinate locations":"0,50,300,100", "extraction_confidence":0.95},
{"field label": "What is your objective for joining the program?", "text value":
"There are many reasons for joining the program. I would like to add my
expertise in different areas to the project. In addition, I would like to receive
training to learn new techniques. Moreover, I would then apply the new
techniques to other projects that I am working on and train my team members on
these new techniques.", "coordinate locations":"0,100,300,800",
"extraction_confidence":0.88},
{"field label": "When can you start?", "text value": "7/20/19", "coordinate
locations":"0,800,300,850", "extraction_confidence":0.98}
]
}
```
— 620

FIG. 6

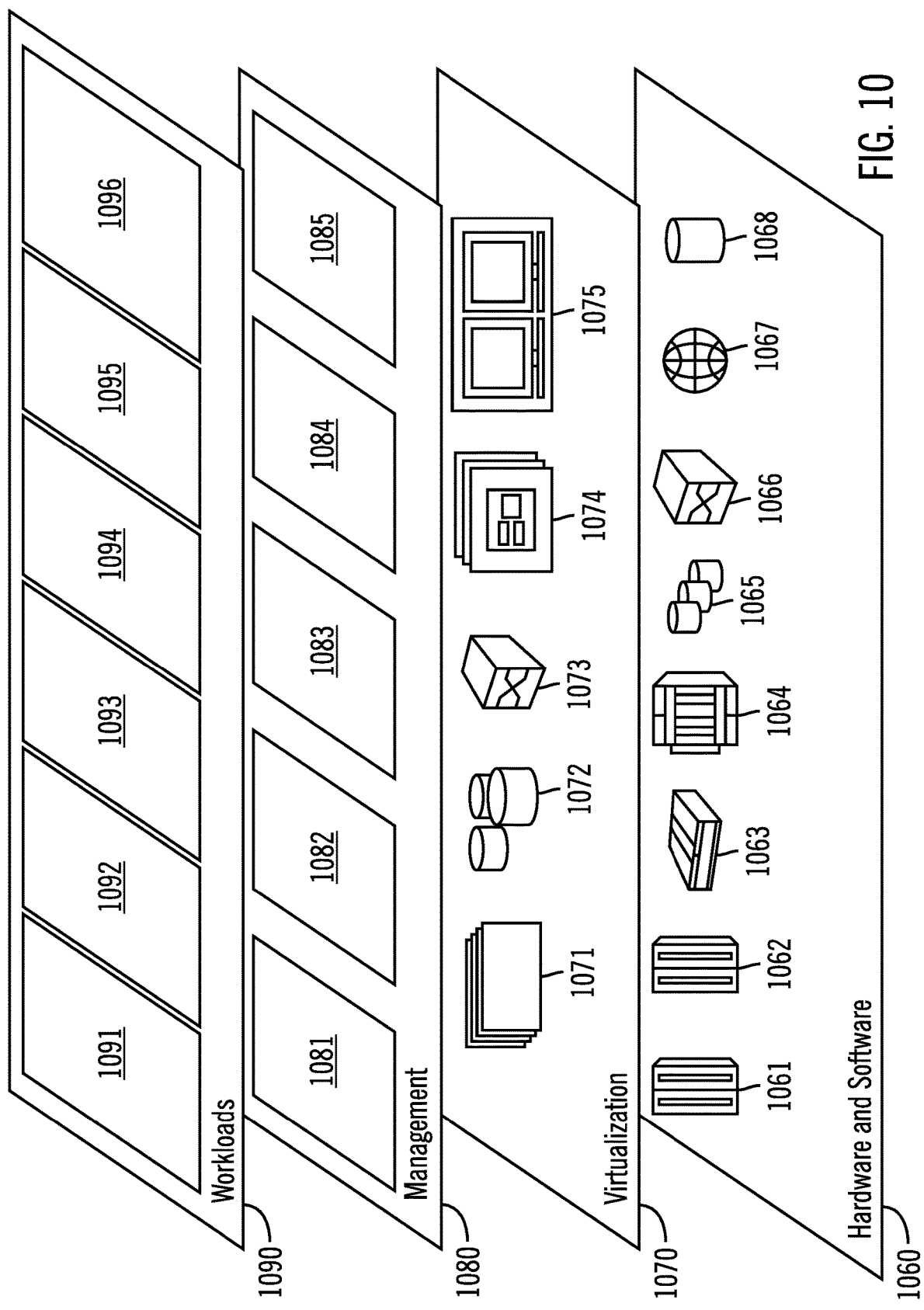

OPTICAL CHARACTER RECOGNITION (OCR) INDUCTION FOR MULTI-PAGE CHANGES

BACKGROUND

Embodiments of the invention relate to Optical Character Recognition (OCR) induction for multi-page changes.

Typed, handwritten or printed text may be scanned to form images. A set of images may represent pages of a document. The pages have elements, which include text areas (e.g., one for a name field and another for an address field), labels for the text areas (e.g., "Name" and "Address"), and other page content. OCR may be described as conversion of these images into digital text.

Some text areas may be variable length. For OCR processing of documents that have variable length text areas, the amount of text input into the text areas may change the page (e.g., a text field is shifted on the page) or the pagination of the document (e.g., where elements move from page number 1, to page number two).

An OCR processor may be trained to recognize the text areas. In particular, the OCR processor may be trained on where text areas are in a page (e.g., coordinate location (x1, y1) is a starting position for a name, coordinate location (x50, y70) is a starting position for an address, etc.). There are some instances when there is a variable length text area that allows a user to enter text into that text area and that causes a shift of another text area onto a next page, and this may result in the pages of the document being out of sequence. In conventional systems, since the OCR model is not trained for such overflow and having the pages out of sequence, the OCR processing may result in errors. For example, in a document, page 1 is expected to have demographics, page 2 is expected to have activity history, page 3 is expected to have awards. However, if the text for page 1 extends into page 2, then page 2 has both demographics and activity history and may even overflow to page 3, thus changing both pages 2 and 3. With this, it is not just pages getting out of sequence, but also each page looking different with elements in the pages shifting.

SUMMARY

In accordance with certain embodiments, a computer-implemented method is provided for OCR induction for multi-page changes. The computer-implemented method comprises operations. A plurality of documents of a document type are processed to generate text area data for a text area in one or more documents of the plurality of documents, where the text area data includes coordinate locations of a zone for the text area based on expansion and direction of shift of the text area, and where the expansion is based on a font type and a font size of text values in the text area. A page flow model is trained using the plurality of documents and the text area data. In response to receiving a new document comprising the text area, a scanning script is received from the page flow model, where the page flow model identifies a new zone for the text area in the new document and determines how to adjust another zone for an element in the new document, and where the page flow model generates the scanning script to describe new coordinate locations of the new zone and the another zone in the new document. The scanning script is used to scan the new document to generate digital text.

In accordance with other embodiments, a computer program product is provided for OCR induction for multi-page changes. The computer program product comprises a computer readable storage medium having program code embodied therewith, the program code executable by at least one processor to perform operations. A plurality of documents of a document type are processed to generate text area data for a text area in one or more documents of the plurality of documents, where the text area data includes coordinate locations of a zone for the text area based on expansion and direction of shift of the text area, and where the expansion is based on a font type and a font size of text values in the text area. A page flow model is trained using the plurality of documents and the text area data. In response to receiving a new document comprising the text area, a scanning script is received from the page flow model, where the page flow model identifies a new zone for the text area in the new document and determines how to adjust another zone for an element in the new document, and where the page flow model generates the scanning script to describe new coordinate locations of the new zone and the another zone in the new document. The scanning script is used to scan the new document to generate digital text.

In accordance with yet other embodiments, a computer system is provided for OCR induction for multi-page changes. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A plurality of documents of a document type are processed to generate text area data for a text area in one or more documents of the plurality of documents, where the text area data includes coordinate locations of a zone for the text area based on expansion and direction of shift of the text area, and where the expansion is based on a font type and a font size of text values in the text area. A page flow model is trained using the plurality of documents and the text area data. In response to receiving a new document comprising the text area, a scanning script is received from the page flow model, where the page flow model identifies a new zone for the text area in the new document and determines how to adjust another zone for an element in the new document, and where the page flow model generates the scanning script to describe new coordinate locations of the new zone and the another zone in the new document. The scanning script is used to scan the new document to generate digital text.

BRIEF DESCRIPTION OF THE SEVERAL VIEWS OF THE DRAWINGS

Referring now to the drawings in which like reference numbers represent corresponding parts throughout:

FIG. 2 illustrates example pages in accordance with certain embodiments.

FIG. 6 illustrates examples of scanning scripts in accordance with certain embodiments.

FIG. 10 illustrates abstraction model layers in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments are able to predict when text areas on a page will overflow (e.g., result in moving an element to another page) or underflow (e.g., result in moving an element on a same page). An element may be a text area, a label, and other page content (e.g., an image, additional text not associated with a text area, etc.). Then, embodiments train a page flow model based on the possible overflow or underflow and change the location information (e.g., coordinate locations) of zones for the text areas to enable better processing of the text values in the text areas. Text areas may be described as being within zones.

Figure 1:
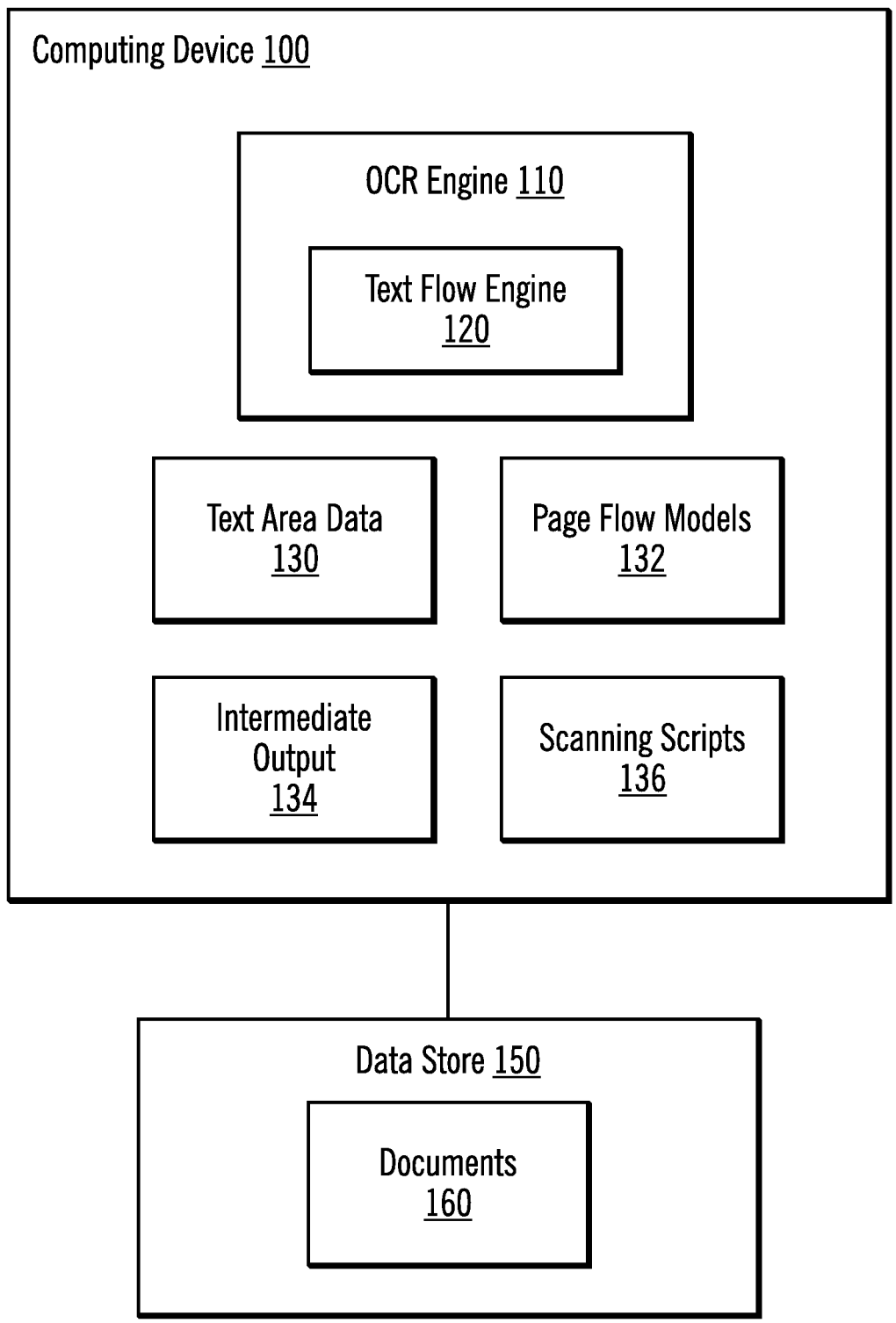
FIG. 1 illustrates, in a block diagram, a computing environment in accordance with certain embodiments.

FIG. 1 illustrates, in a block diagram, a computing environment in accordance with certain embodiments. A computing device 100 is connected to a data store 150. The computing device 100 includes an OCR engine 110, which includes an text flow engine 120. The computing device 100 includes text area data 130 for text areas, page flow models 132 (learning templates), intermediate output 134, and scanning scripts 136.

In certain embodiments, there is text area data for each document type (e.g., if three document types have been processed, then there are three text area data files).

The data store 150 includes documents 160, and the documents 160 have document types (e.g., a user profile document type, a medical billing document type, etc.). The documents 160 have pages with text areas. In certain embodiments, one or more of the pages of a document may not have text areas.

The text flow engine 120 processes the documents 160 to generate page flow models 132. In certain embodiments, each page flow model 132 is associated with a particular document type (e.g., one page flow model 132 is for a user profile document type, while another page flow model 132 is for a medical billing document type). In certain embodiments, the page flow models 132 are machine learning models, such as regression models or neural network models. The page flow models 132 generate the intermediate output 134 and the scanning scripts 136.

The text flow engine 120 calculates the potential sizes of text areas that have variable length text areas on each page of a document 160 based on the pixel size of text values in the text areas, taking into consideration font (type and size) and size (length) of text values (i.e., number of characters) and, optionally, historical data. A text area may be described as a text box or an input area that stores text values. In certain embodiments, the text areas have a label (name), a position (coordinate location x, y), a size, and, optionally, a font type and font size. The text values stored in a text area may be alphabetic characters, numbers, symbols, links to other documents, images or links to images, etc.

The text areas may be described as being within bounding boxes. The text flow engine 120 extrapolates the coordinate locations of the zone (e.g., a bounding box) for each text area of each page and deduces possible page overflow or underflow. A bounding box represents the entire area that the text area may expand to. In certain embodiments, the coordinate locations of the zone for the text area may be four coordinate locations corresponding to the corners of the zone.

Based on the possible page overflows or underflows, the text flow engine 120 generates a page flow model 132, and the page flow model 132 generates a scanning script 136 that depicts the overflow or underflow of elements on the page and enables post processing correction of elements based on the text areas and the shifts of elements on each page.

Initially, the text flow engine 120 first looks for these variable length text areas in documents and dynamically selects or approximates complementary page flow models 132 for processing a document of a particular document type and uses the page flow model 132 to process the elements of pages of a document and generate a scanning script 136.

FIG. 2 illustrates example documents 210, 220 in accordance with certain embodiments. In this example, the documents 210, 220 each have one page. For documents 210, 220, the name ("User A", "User B") is zone-based. With zone-based OCR, the OCR engine 110 is trained to recognize a specific part of a document. With document 210, the answer to the question "What is your objective for joining the program?" is short and does not push down the question "When can you start?". On the other hand, with document 220, the answer to the question "What is your objective for joining the program?" is long, which expands this field and pushes the question "When can you start?" farther down the page. In this example, the start date is not accessible with conventional processing because the start date field has been pushed downward. However, the OCR engine 110 and the text flow engine 120 are able to process the start date field that has shifted downwards.

Figure 3A:
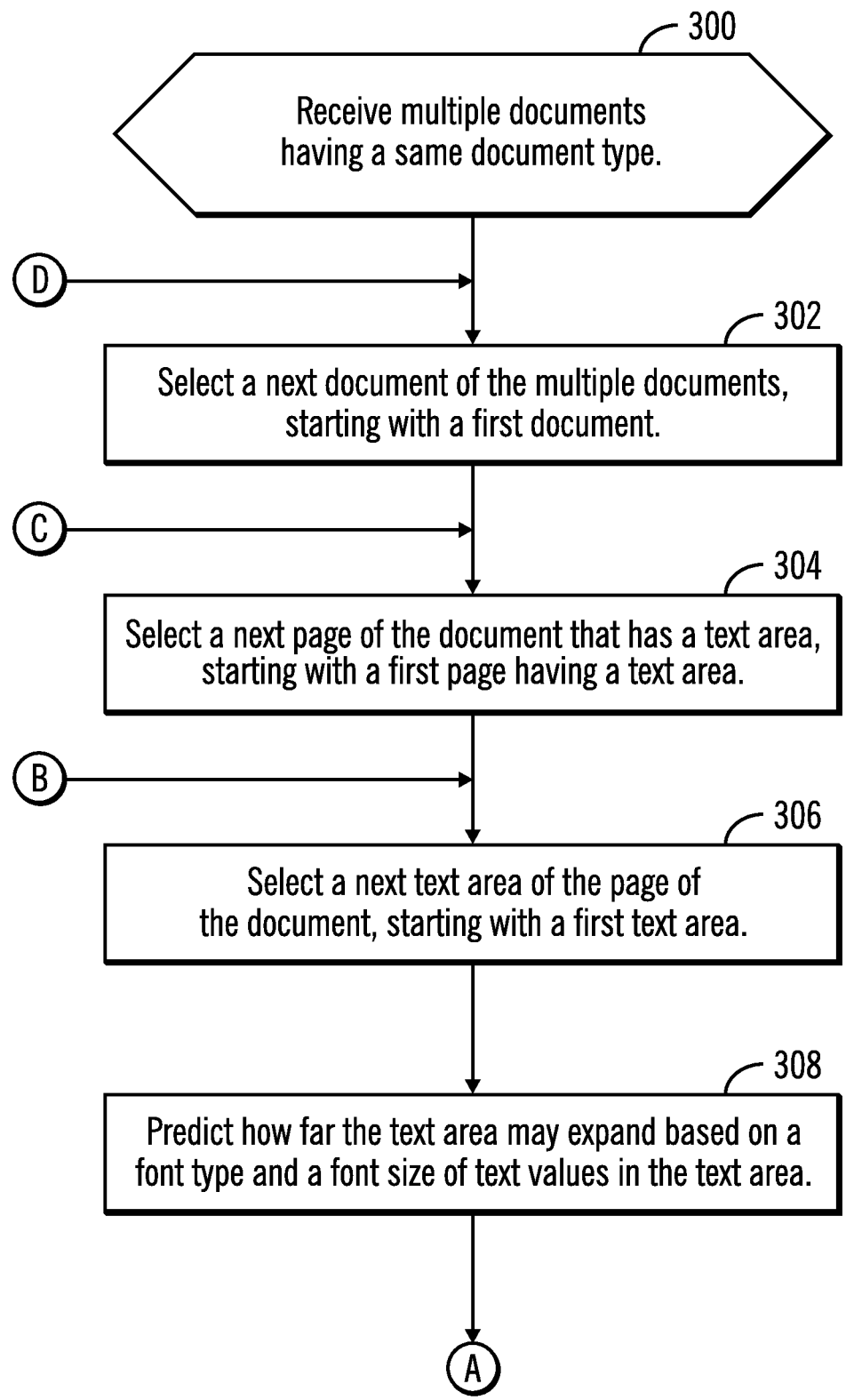
FIGS. 3A and 3B illustrate, in a flowchart, operations for creating a page flow model in accordance with certain embodiments.
Figure 3B:
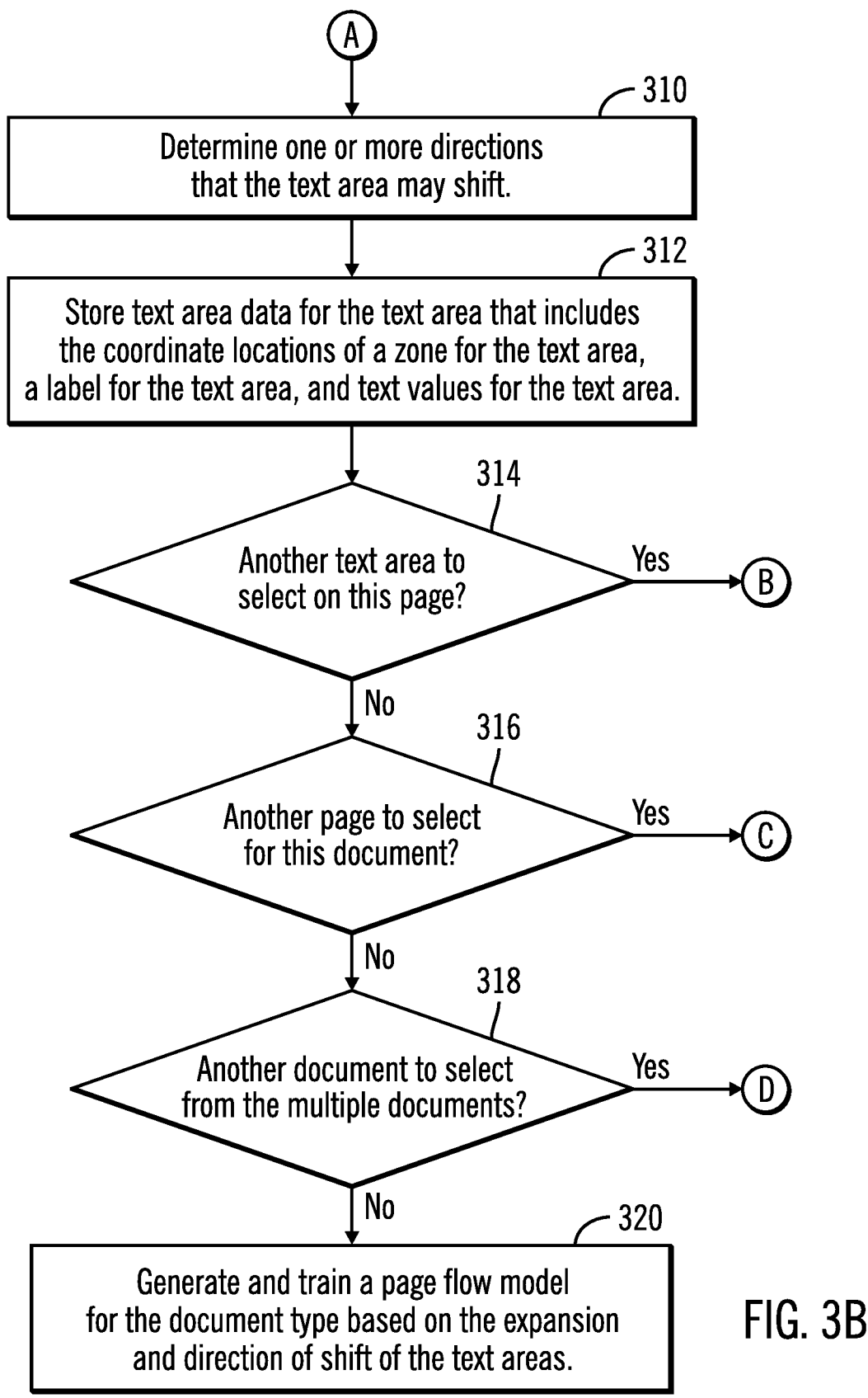

FIGS. 3A and 3B illustrate, in a flowchart, operations for creating a page flow model 132 in accordance with certain embodiments. Control begins at block 300 with the text flow engine 120 receiving multiple documents having a same document type. Different documents having the same document type have the same one or more text boxes, but the size of the text boxes may change based on the text values (e.g., based on the number of characters, font type, font size) in those text boxes. In certain embodiments, a document has one or more text boxes, but a particular page of the document may have zero or more text boxes.

In block 302, the text flow engine 120 selects a next document of the multiple documents, starting with a first document. In block 304, the text flow engine 120 selects a next page of the document that has a text area, starting with a first page having a text area. With embodiments, pages without text areas may be skipped. For example, the document has: page 1 with no text area and page 2 with a text area, then page 2 is selected, while page 1 is skipped. In block 306, the text flow engine select a next text area of the page of the document, starting with a first text area. In certain embodiments, the text area selected is a variable length text area.

In block 308, the text flow engine 120 predicts how far the text area may expand based on a font type and a font size of text values in the text area (i.e., predicts the bounding box for the text box). Predicting how far the text area may expand indicates that at a particular font type and font size, the text area will take X space. In certain embodiments, the font type and the font size are determined from the data in that text area. In certain embodiments, a font type and a font size are associated with the text box. In certain embodiments, different documents of the same type may use different font types and different font sizes for the same text field.

In certain embodiments, the text flow engine 120 obtains an upper bound for the text area size from the page itself (e.g., based on the text area accepting 1000 characters) or from historical data for that text area and for that document type (e.g., a user profile document type, a medical billing document type, etc.). The text flow engine 120 obtains the font type and font size for the text area from the page and extrapolates that to a pixel size of the text. The text flow engine 120 evaluates a maximum variable length text area using medium to large character types based on the maximum characters allowed for that text area. Then, the text flow engine 120 determines the vertical and/or horizontal coordinate shifts of a zone for the text area based on the overall coordinate locations of the page for the maximum variable length.

From block 308 (FIG. 3A), processing continues to block 310 (FIG. 3B). In block 310, the text flow engine 120 determines one or more directions that the text area may shift. In certain embodiments, the text flow engine 120 obtains the one or more directions from a source Hypertext Markup Language (HTML). For example, Cascading Style Sheets (CSS) describe how HTML elements are to be displayed on a page and indicates the way the HTML elements may flow. In certain embodiments, the orientation of the shift may be shifted vertically (down or up) and/or shifted horizontally (left or right).

In block 312, the text flow engine 120 stores text area data 130 for the text area that includes the coordinate locations of a zone for the text area, a label for the text area, and text values for the text area. The coordinate locations of the zone are based on the expansion and the direction of the shift. The coordinate locations may be provided using one or more (longitude x, latitude y) coordinates.

In block 314, the text flow engine 120 determines whether there are is another text area to select on this page. If so, processing continues to block 306 (FIG. 3A) to select the next text area, otherwise, processing continues to block 316.

In block 316, the text flow engine 120 determines whether there is another page to select for this document. If so, processing continues to block 304 (FIG. 3A), otherwise, processing continues to block 318.

In block 318, the text flow engine 120 determines whether there is another document to select from the multiple documents. If so, processing continues to block 302 (FIG. 3A), otherwise, processing continues to block 320.

In block 320, the text flow engine 120 generates and trains a page flow model 132 for the document type based on the expansion and direction of shift of the text areas. The page flow model 132 is stored. Then, when a document of the document type is received, the page flow model 132 for that document type is used to generate a scanning script for the document. For example, FIG. 2 illustrates two documents 210, 220 having the same document type, "General Intake Form", but with different information in the text areas. These documents 210, 220, along with other documents of the same document type, may be used to train the page flow model 132.

Thus, the text flow engine 120 trains the page flow model 132 based on different combinations of expansion and direction of shift of text areas found in the different documents. The page flow model 132 adjusts and moves additional elements (e.g., labels of other text areas and the other text areas) on one or more pages of a document to shift their coordinate locations. The page flow model 132 provides a scanning script that indicates the new coordinate locations of the zones for the text areas and other elements.

The page flow model 132 is trained by the text flow engine 120 to handle adjustments for middle of page shifts that move related text areas either with movement of an existing text area or without movement of that existing text area. The page flow model 132 is trained to utilize zone-based adjustments for the page. Zones may be described as where the text area is expected to be located after the expansion and shift. The page flow model 132 may add the zone-based adjustments to the text area data 130 for post processing each page.

With training of the page flow model 132 allows for creation of a scanning script 136 that describes where an element resides and the flow of the elements and their coordinate locations on the pages of the document to enable more accurate processing of the elements of that document when performing OCR processing to digitize the document.

With embodiments, the processing of FIGS. 3A and 3B occurs for each document type to generate a train a page flow model 132 for that document type.

Figure 4A:
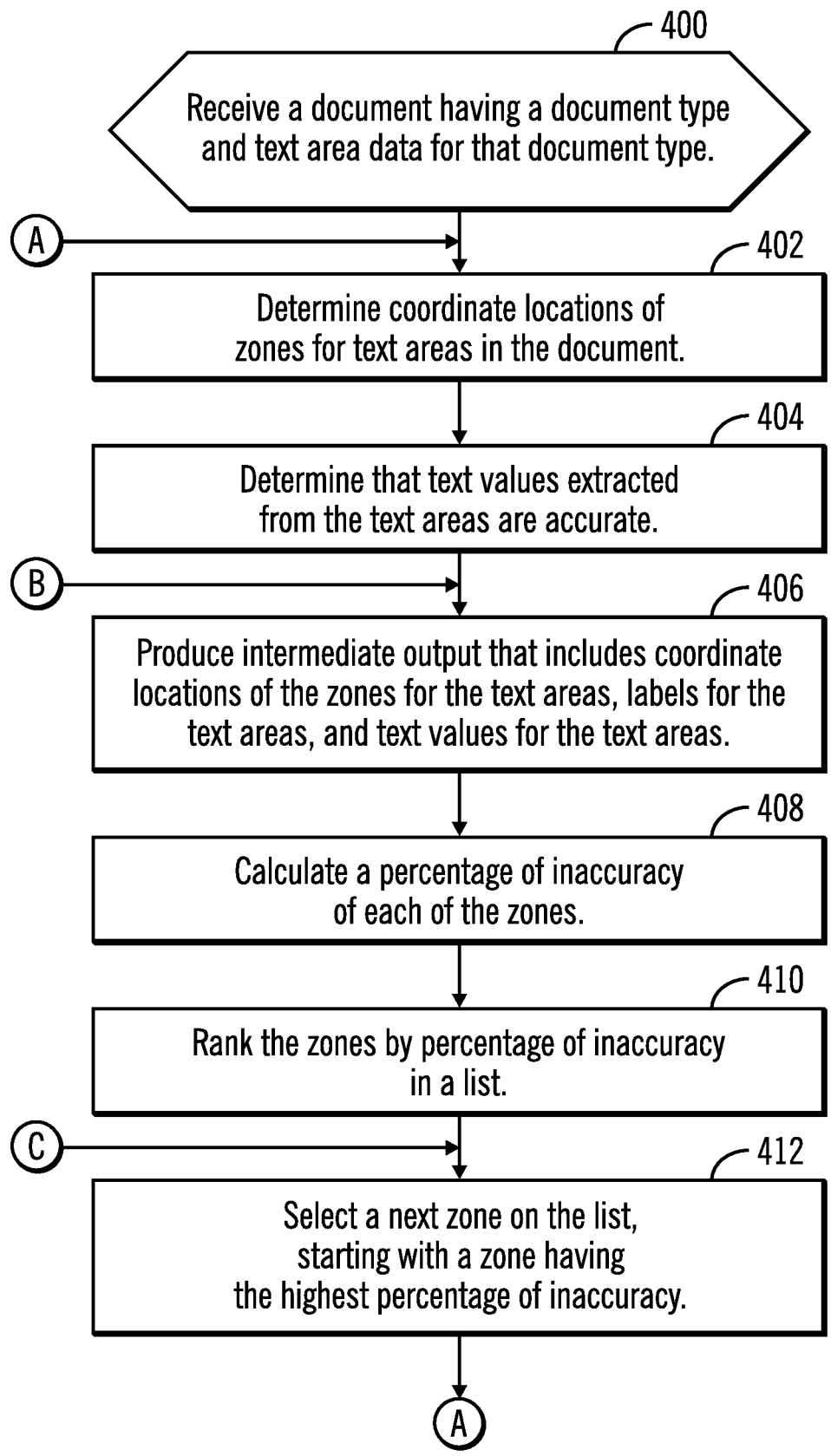
FIGS. 4A and 4B illustrate, in a flowchart, operations performed by the page flow model to generate a scanning script in accordance with certain embodiments.
Figure 4B:
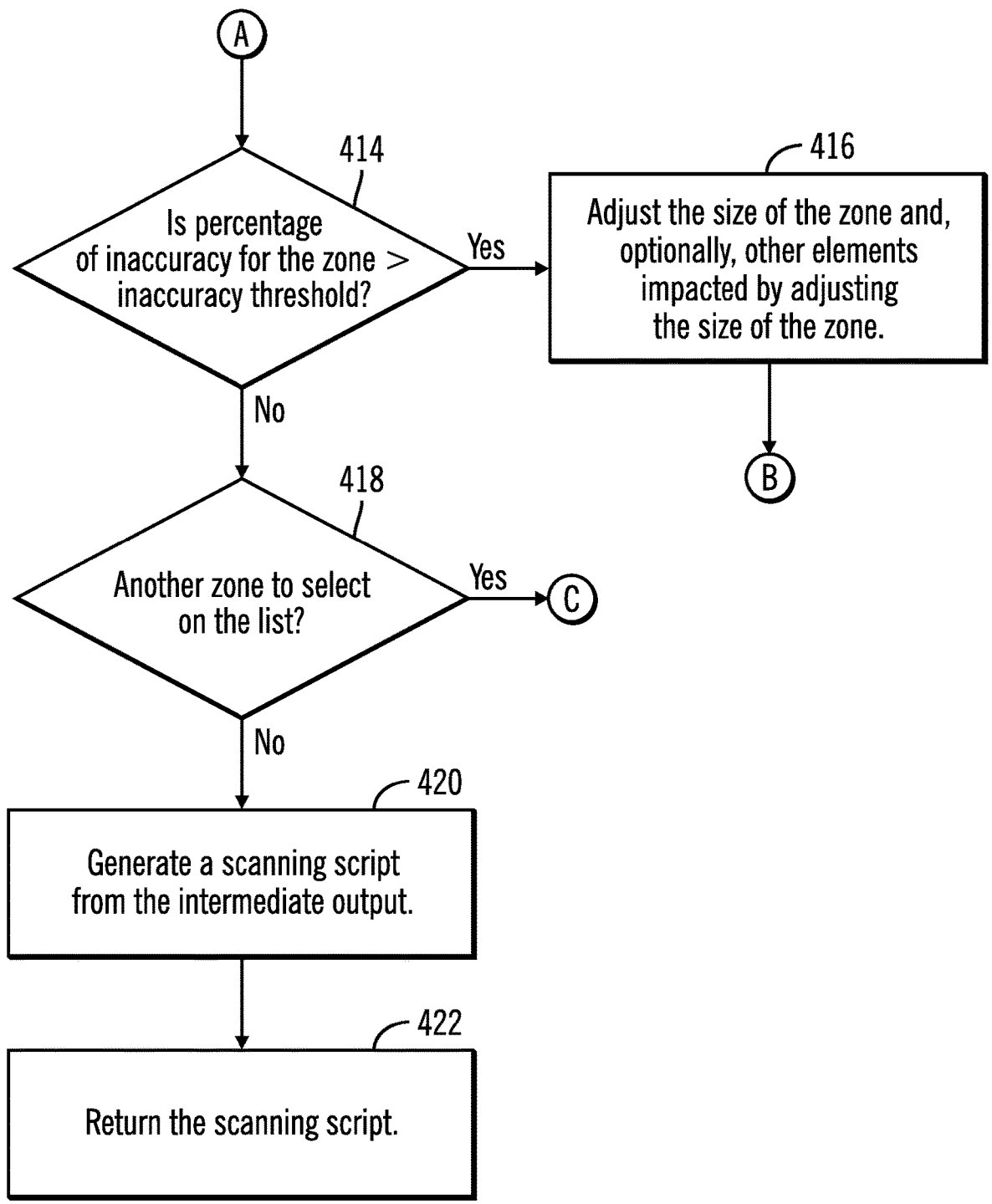

FIGS. 4A and 4B illustrate, in a flowchart, operations performed by the page flow model 132 to generate a scanning script in accordance with certain embodiments. Control begins at block 400 with the page flow model 132 receiving a document having a document type and text area data 130 for that document type.

In block 402, the page flow model 132 determines coordinate locations of the zones (e.g., the best fit variable zones) for text areas in the document. The page flow model 132 evaluates location and size of variable zones based on predicted zone information (e.g., using coordinate locations stored in the text area data 130). In certain embodiments, this determination of the best fit variable zones includes processing the document to identify elements, including the text areas, and values in the text areas.

In block 404, the page flow model 132 determines that the text values extracted from the text areas are accurate. That is, the page flow model 132 performs a Natural Language Processing (NLP) completeness check for the domain based on extracted text values (e.g., if the date is scanned, the text area size does not change). In certain embodiments, the domain is based on the content within the box and the text area label. For example, if the textbox is "starting date", then the page flow model 132 tries to transcribe the content of the text area into a valid date. In other embodiments, the document type may be used for determining domain in addition to using the label and the content of the text area. In certain embodiments, if the page flow model 132 finds that the extracted text values are not accurate, further processing is done (e.g., the text values are extracted again, an error message is sent to a system administrator, etc.).

In block 406, the page flow model 132 produces intermediate output 134 that includes coordinate locations of the zones for the text areas, labels for the text areas, and text values for the text areas.

In block 408, the page flow model 132 determines a percentage of in accuracy of each of the zones. In certain embodiments, the percentage of accuracy may also be referred to as an extraction confidence. In certain embodiments, for each of the zones, the page flow model 132 takes text from a variable length text area within that zone and calculates an expected size of the zone. The page flow model 132 matches the expected size of the zone with a historical size of the zone (e.g., a size of the zone based on "known-good" OCR output) to deduce the percentage of inaccuracy of the zone. The historical size of the zone may be based on historical OCR output that has been stored from previous OCR processing.

In block 410, the page flow model 132 ranks the zones by percentage of inaccuracy in a list. The zones are ranked from the highest percentage of inaccuracy to the lowest percentage of inaccuracy. In certain embodiments, there is one zone for one text area that causes other elements (e.g., text or images) to shift.

In block 412, the page flow model 132 selects a next zone on the list, starting with a zone having the highest percentage of inaccuracy. From block 412 (FIG. 4A), processing continues to block 414 (FIG. 4B).

In block 414, the page flow model 132 determines whether the percentage of inaccuracy for the zone exceeds (is greater than) an inaccuracy threshold. If so, processing continues to block 416, otherwise, processing continues to block 418. In certain embodiments, the page flow model 132 adjusts accuracy for the zone for a text area and other zones in the document if the expected size of the zone is determined to be over a pixel distance threshold from the historical size of the zone. In certain embodiments, the page flow model 132 estimates the length of text values in a text area from historical data and multiplies that by the font size to get a pixel size for the expected size of the zone, and this pixel size is compared to a pixel distance threshold.

The page flow model 132 adjusts other elements in the document, as needed. In particular, embodiments perform multiple adjustments. For example, if the zone is changed for one box, then the zone may need to be adjusted for other boxes that occur before or after that box in the same document.

In block 416, the page flow model 132 adjusts the size of the zone (i.e., adjusts the coordinate locations of the zone) and, optionally, other elements (e.g., other zones and labels) impacted by adjusting the size of the zone. From block 416 (FIG. 4B), processing continues to block 406 (FIG. 4A).

For example, if zone 2 is a long text field and zone 3 is a date, then, if zone 3 starts too high, zone 3 would get text and a date (which is not very accurate). In this example, zone 2 is scored as accurate since it contains text. However, if zone 3 is adjusted to start lower, and zones 2 and 3 are vertically adjacent zones (i.e., zone 2 is above zone 3), then zone 2 is adjusted to end lower.

In block 418, the page flow model 132 determines whether there is another zone to select on the list. If so, processing continues to block 412 (FIG. 4A), otherwise, processing continues to block 420.

In block 420, the page flow model 132 generates a scanning script from the intermediate output 134. In block 422, the page flow model 132 returns the scanning script 136 (i.e., final output information) for OCR processing of a document with multiple pages. The scanning script 136 may be described as providing the OCR engine 110 with information on better processing of a document with variable length text areas.

Thus, the zones may be adjusted based on the expected size for zones to provide more accurate information in the scanning script 136 for the OCR engine 110.

The adjustments to each zone may be to the zone vertically and/or horizontally. For example, if the text area is expected to overflow, then the OCR engine 110 is notified, via the scanning script, to scan a different and/or bigger area for that text area. Thus, the adjustment is performed to provide more accurate information for scanning.

The adjustments from blocks 406-418 allow for post processing correction of text values, zones, and other elements based on the shifts of elements. Thus, embodiments correct scanned text.

Figure 5:
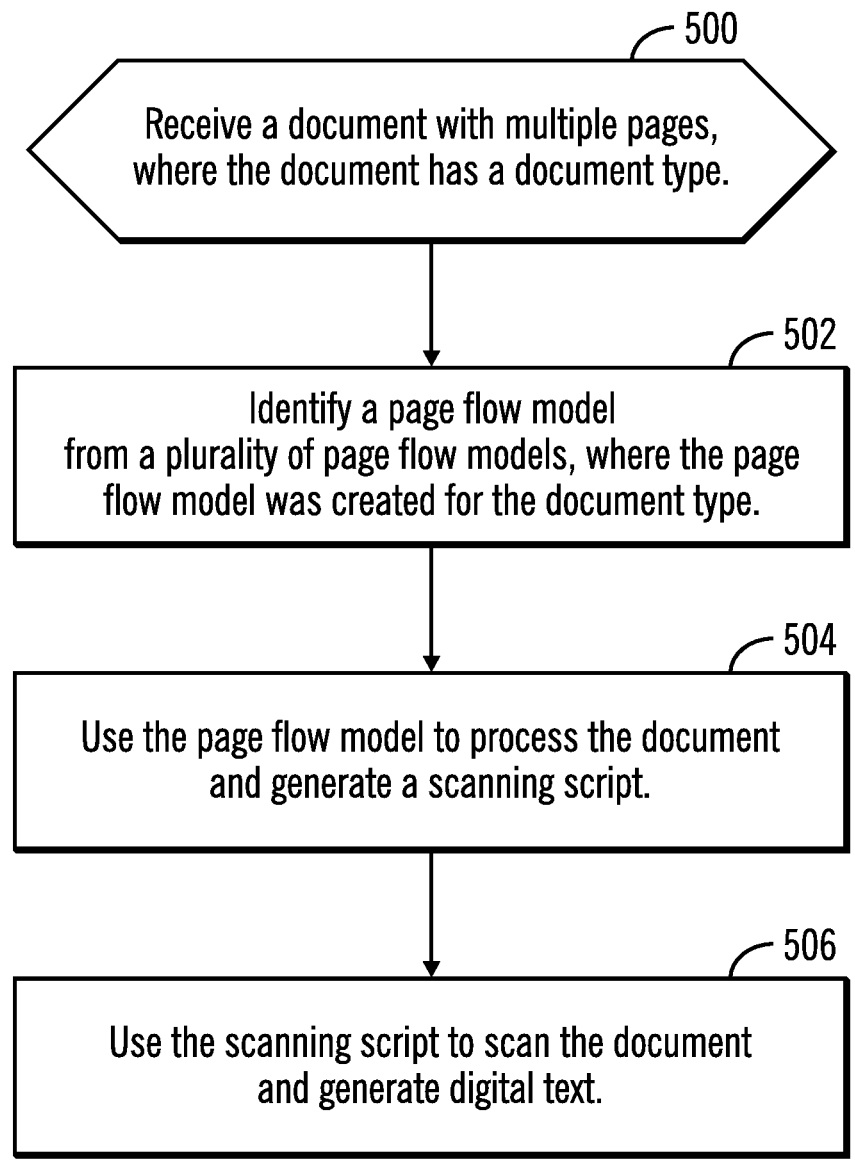
FIG. 5 illustrates, in a flowchart, operations for using the scanning script to process a document in accordance with certain embodiments.

FIG. 5 illustrates, in a flowchart, operations for using the scanning script to process a document in accordance with certain embodiments. Control begins at block 500 with the text flow engine 120 receiving a document with multiple pages, where the document has a document type. In block 502, the text flow engine 120 identifies (i.e., selects) a page flow model 132 from a plurality of page flow models, where the page flow model 132 was created for the document type. In certain embodiments, each of the page flow models 132 is associated with an accuracy based on how accurate the scan of a document was using that page flow model 132 (e.g., from historical data), and the text flow engine 120 selects the most accurate model (i.e., the one that scanned most or all of the text areas to the correct field types). In certain embodiments, each page flow model 132 is associated with a font and a font size.

In block 504, the text flow engine 120 uses the page flow model 132 to process the document and generate a scanning script, where the page flow model 132 improves accuracy by making adjustments to the scanning script that take into account overflows and underflows of variable length text areas.

In block 506, the text flow engine 120 (or OCR engine 110) uses the scanning script 136 to scan the document and generate digital text. Because a scanning script 136 is selected, the text flow engine 120 is able to process a document for which text areas have caused elements to shift on a page or onto another page. In this manner, embodiments provide OCR induction for multi-page changes.

FIG. 6 illustrates examples of scanning scripts 610, 620 in accordance with certain embodiments. The OCR engine 110 generates scanning scripts 610, 620 using a page flow model 132 created by the text flow engine 120 for documents 210, 220. In certain embodiments, the OCR engine 110 produces structured scanning scripts 610, 620, for example, as a JavaScript® Object Notation (JSON) document. (JavaScript is a registered trademark of Oracle Corporation in the United States and/or other countries.)

In this example, the scanning scripts 610, 620 include the field names and text values, along with additional metadata. The additional metadata includes coordinate locations of the zones for the text areas and an accuracy ("extraction_confidence"). In certain embodiments, accuracy may be based on whether the content matches the domain and may be assessed by a probabilistic model scored 0-1.

With embodiments, the text flow engine 120 considers location on each page of a document and context of headers to provide better error correction of the document that has been processed by the OCR engine 110. Also, the text flow engine 120 improves scanning of sub-sections (e.g., text areas) of each page of the document.

With embodiments, the text flow engine 120 extrapolates the potential sub-sections based on the variability of text areas without actual data and improves the accuracy for processing documents with the variable length text areas.

With embodiments, the text flow engine 120 predicts expected skew based on the document contents and performs an analysis of the scanned text of the document to determine whether a corrective scan is to be performed.

In certain embodiments, the text flow engine 120 predicts a page overflow or underflow for training a page overflow model based on possible overflow or underflow of elements that may end on different pages for changing the location of such page information within the results of the OCR engine 110.

In certain embodiments, the text flow engine 120 calculates a plurality of sizes of a text area that is variable length based on a pixel size of text values in the text area, where the pixel sizes is based on the font type and the font size of the text values. The text flow engine 120 extrapolates coordinate locations for a bounding box of values of a text area for a first page of a document comprising a plurality of pages. The text flow engine 120 deduces a page overflow or underflow based on the coordinate locations for the bounding box to generate a page flow model 132, where the page flow model 132 depicts overflow or underflow elements that shift. The text flow engine 120 receives a new document comprising a plurality of pages for processing by the OCR engine 110 and selects a page flow model 132 of multiple page flow models (with different page flow models for different document types). Then, the text flow engine 120 processes the new document comprising the plurality of pages using a scanning script produced by the page flow model 132.

Embodiments are applicable to both overflow and underflow. For example, with overflow elements on page 1 shift into page 2, which may cause some elements from page 2 to shift to page 3. With underflow, less text than expected is in the text area, and elements on page 3 shift to page 2.

Embodiments handle variability of variable length text areas for modeling (i.e., training the page flow models 132), processing execution (i.e., to determine coordinate locations of the zones and other elements), and post processing of the zones and other elements (prior to generating the scanning script).

Embodiments calculate the potential sizes of text areas based on the pixel size of values in those text areas, taking in consideration font type and font size of the values, then extrapolate the (x, y) coordinates for the bounding boxes of these values, and deduce page overflows or underflows.

Figure 7:
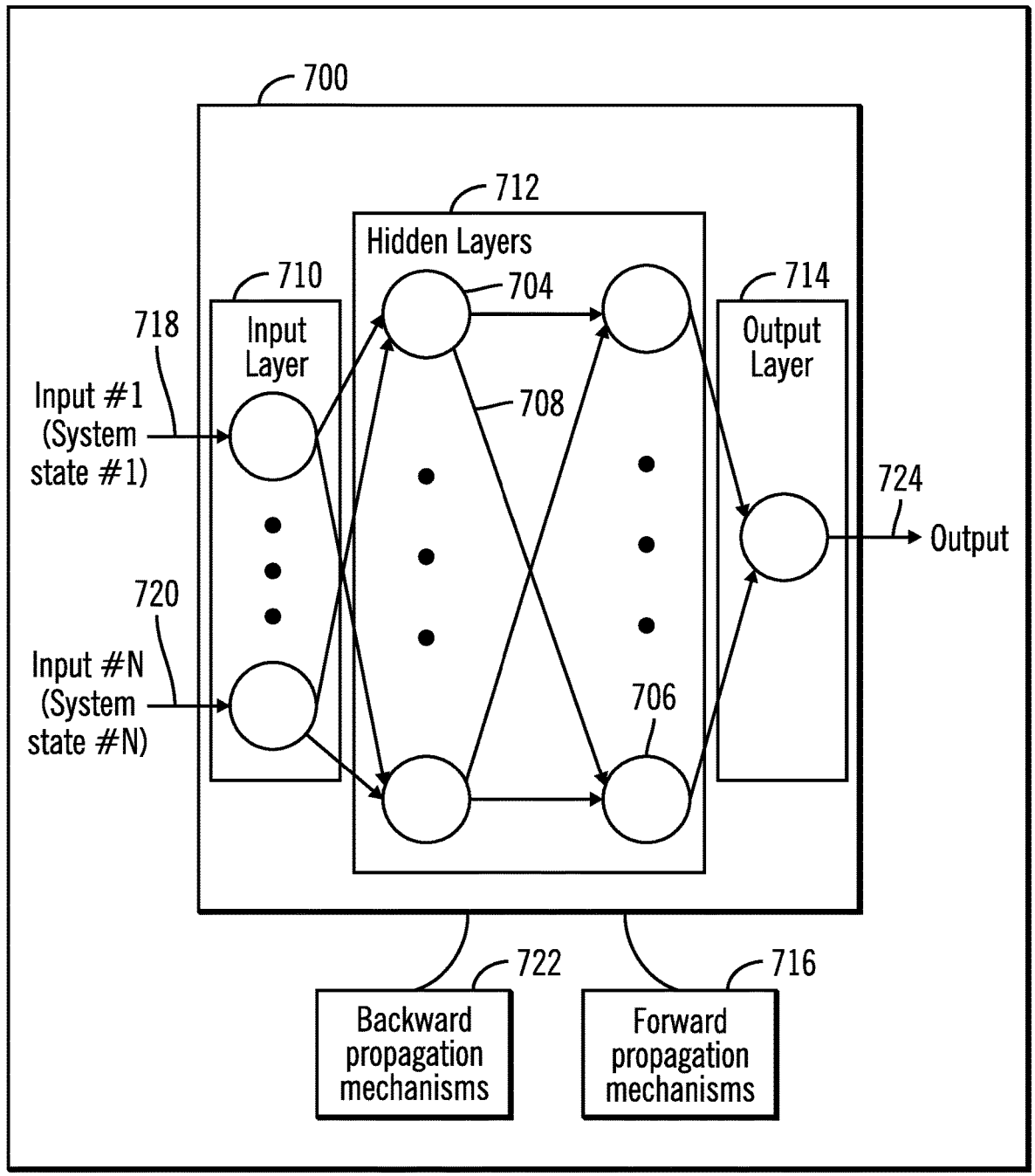
FIG. 7 illustrates, in a block diagram, details of a machine learning module in accordance with certain embodiments.

FIG. 7 illustrates, in a block diagram, details of a machine learning module 700 in accordance with certain embodiments. In certain embodiments, the one or more models 132 are implemented using the components of the machine learning module 700.

The machine learning module 700 may comprise a neural network with a collection of nodes with links connecting them, where the links are referred to as connections. For example, FIG. 7 shows a node 704 connected by a connection 708 to the node 706. The collection of nodes may be organized into three main parts: an input layer 710, one or more hidden layers 712, and an output layer 714.

The connection between one node and another is represented by a number called a weight, where the weight may be either positive (if one node excites another) or negative (if one node suppresses or inhibits another). Training the machine learning module 700 entails calibrating the weights in the machine learning module 700 via mechanisms referred to as forward propagation 716 and backward propagation 722. Bias nodes that are not connected to any previous layer may also be maintained in the machine learning module 700. A bias may be described as an extra input of 1 with a weight attached to it fora node.

In forward propagation 716, a set of weights are applied to the input data 718 . . . 320 to calculate the output 724. For the first forward propagation, the set of weights may be selected randomly or set by, for example, a system administrator. That is, in the forward propagation 716, embodiments apply a set of weights to the input data 718 . . . 720 and calculate an output 724.

In backward propagation 722 a measurement is made for a margin of error of the output 724, and the weights are adjusted to decrease the error. Backward propagation 722 compares the output that the machine learning module 700 produces with the output that the machine learning module 700 was meant to produce, and uses the difference between them to modify the weights of the connections between the nodes of the machine learning module 700, starting from the output layer 714 through the hidden layers 712 to the input layer 710, i.e., going backward in the machine learning module 700. In time, backward propagation 722 causes the machine learning module 700 to learn, reducing the difference between actual and intended output to the point where the two come very close or coincide.

The machine learning module 700 may be trained using backward propagation to adjust weights at nodes in a hidden layer to produce adjusted output values based on the provided inputs 718 . . . 720. A margin of error may be determined with respect to the actual output 724 from the machine learning module 600 and an expected output to train the machine learning module 700 to produce the desired output value based on a calculated expected output. In backward propagation, the margin of error of the output may be measured and the weights at nodes in the hidden layers 712 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning module 700 is configured to repeat both forward and backward propagation until the weights of the machine learning module 700 are calibrated to accurately predict an output.

The machine learning module 700 implements a machine learning technique such as decision tree learning, association rule learning, artificial neural network, inductive programming logic, support vector machines, Bayesian models, etc., to determine the output value 724.

In certain machine learning module 700 implementations, weights in a hidden layer of nodes may be assigned to these inputs to indicate their predictive quality in relation to other of the inputs based on training to reach the output value 724.

With embodiments, the machine learning module 700 is a neural network, which may be described as a collection of "neurons" with "synapses" connecting them.

With embodiments, there may be multiple hidden layers 712, with the term "deep" learning implying multiple hidden layers. Hidden layers 712 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 716 and the backward propagation 722.

In backward propagation 722, embodiments measure the margin of error of the output and adjust the weights accordingly to decrease the error.

Neural networks repeat both forward and backward propagation until the weights are calibrated to accurately predict the output 724.

In certain embodiments, the inputs to the machine learning module 700 are documents 160 with one or more text areas in one or more pages (e.g., raw form documents) and text area data 130 for those documents 160, and the outputs of the machine learning module 700 is a scanning script 136. In certain embodiments, the machine learning model may be refined based on whether the outputted recommendations, once taken, generate positive outcomes.

Figure 8:
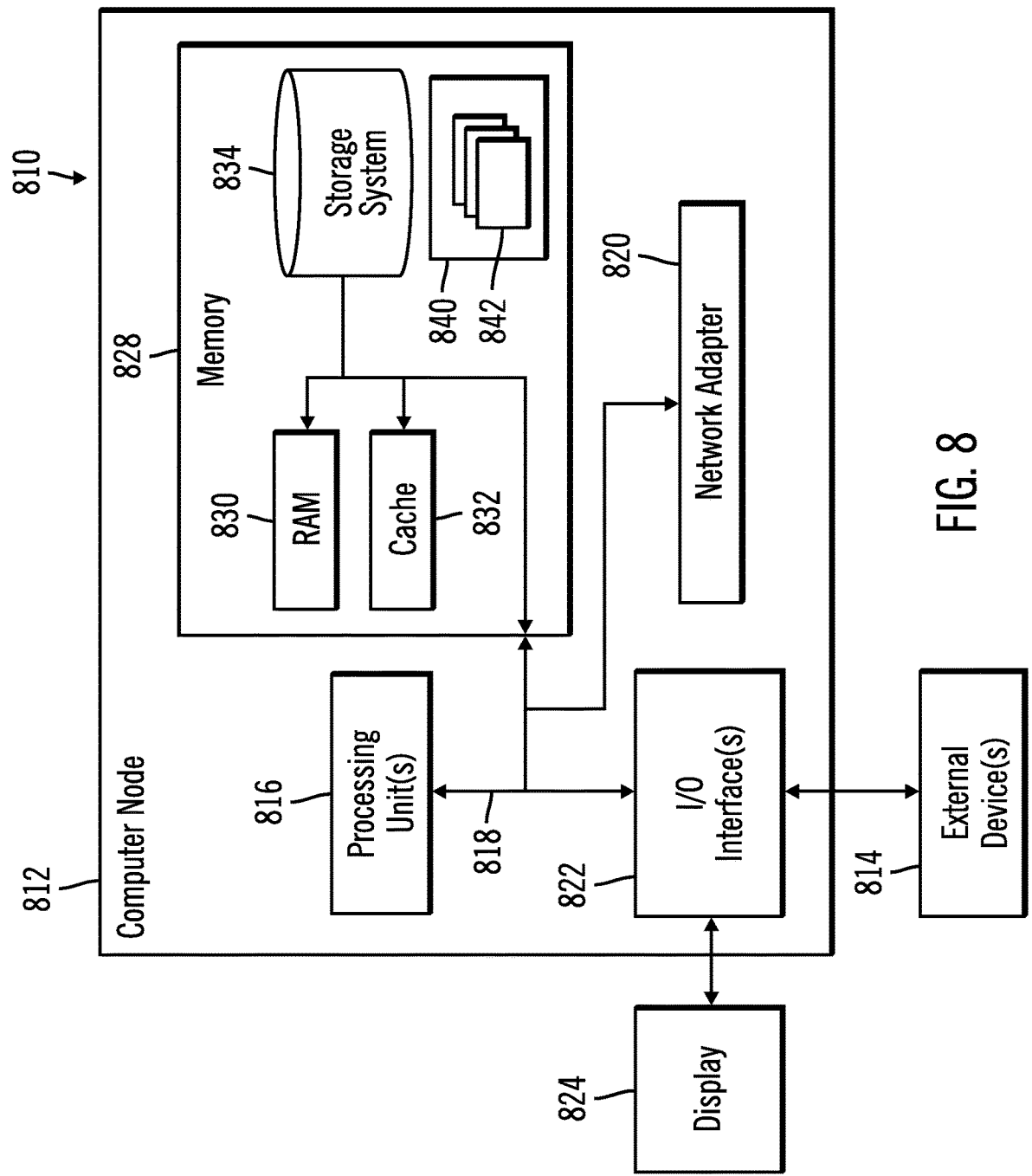
FIG. 8 illustrates a computing node in accordance with certain embodiments.

FIG. 8 illustrates a computing environment 810 in accordance with certain embodiments. In certain embodiments, the computing environment is a cloud computing environment. Referring to FIG. 8, computer node 812 is only one example of a suitable computing node and is not intended to suggest any limitation as to the scope of use or functionality of embodiments of the invention described herein. Regardless, computer node 812 is capable of being implemented and/or performing any of the functionality set forth hereinabove.

The computer node 812 may be a computer system, which is operational with numerous other general purpose or special purpose computing system environments or configurations. Examples of well-known computing systems, environments, and/or configurations that may be suitable for use with computer node 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 812 may be described in the general context of computer system executable instructions, such as program modules, being executed by a computer system. Generally, program modules may include routines, programs, objects, components, logic, data structures, and so on that perform particular tasks or implement particular abstract data types. Computer node 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 812 is shown in the form of a general-purpose computing device. The components of computer node 812 may include, but are not limited to, one or more processors or processing units 816, a system memory 828, and a bus 818 that couples various system components including system memory 828 to one or more processors or processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 812 typically includes a variety of computer system readable media. Such media may be any available media that is accessible by computer node 812, and it includes both volatile and non-volatile media, removable and non-removable media.

System memory 828 can include computer system readable media in the form of volatile memory, such as random access memory (RAM) 830 and/or cache memory 832. Computer node 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, system memory 828 may include at least one program product having a set (e.g., at least one) of program modules that are configured to carry out the functions of embodiments of the invention.

Program/utility 840, having a set (at least one) of program modules 842, may be stored in system memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer node 812 may also communicate with one or more external devices 814 such as a keyboard, a pointing device, a display 824, etc.; one or more devices that enable a user to interact with computer node 812; and/or any devices (e.g., network card, modem, etc.) that enable computer node 812 to communicate with one or more other computing devices. Such communication can occur via Input/Output (I/O) interfaces 822. Still yet, computer node 812 can communicate with one or more networks such as a local area network (LAN), a general wide area network (WAN), and/or a public network (e.g., the Internet) via network adapter 820. As depicted, network adapter 820 communicates with the other components of computer node 812 via bus 818. It should be understood that although not shown, other hardware and/or software components could be used in conjunction with computer node 812. Examples, include, but are not limited to: microcode, device drivers, redundant processing units, external disk drive arrays, RAID systems, tape drives, and data archival storage systems, etc.

In certain embodiments, the computing device 100 has the architecture of computer node 812. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
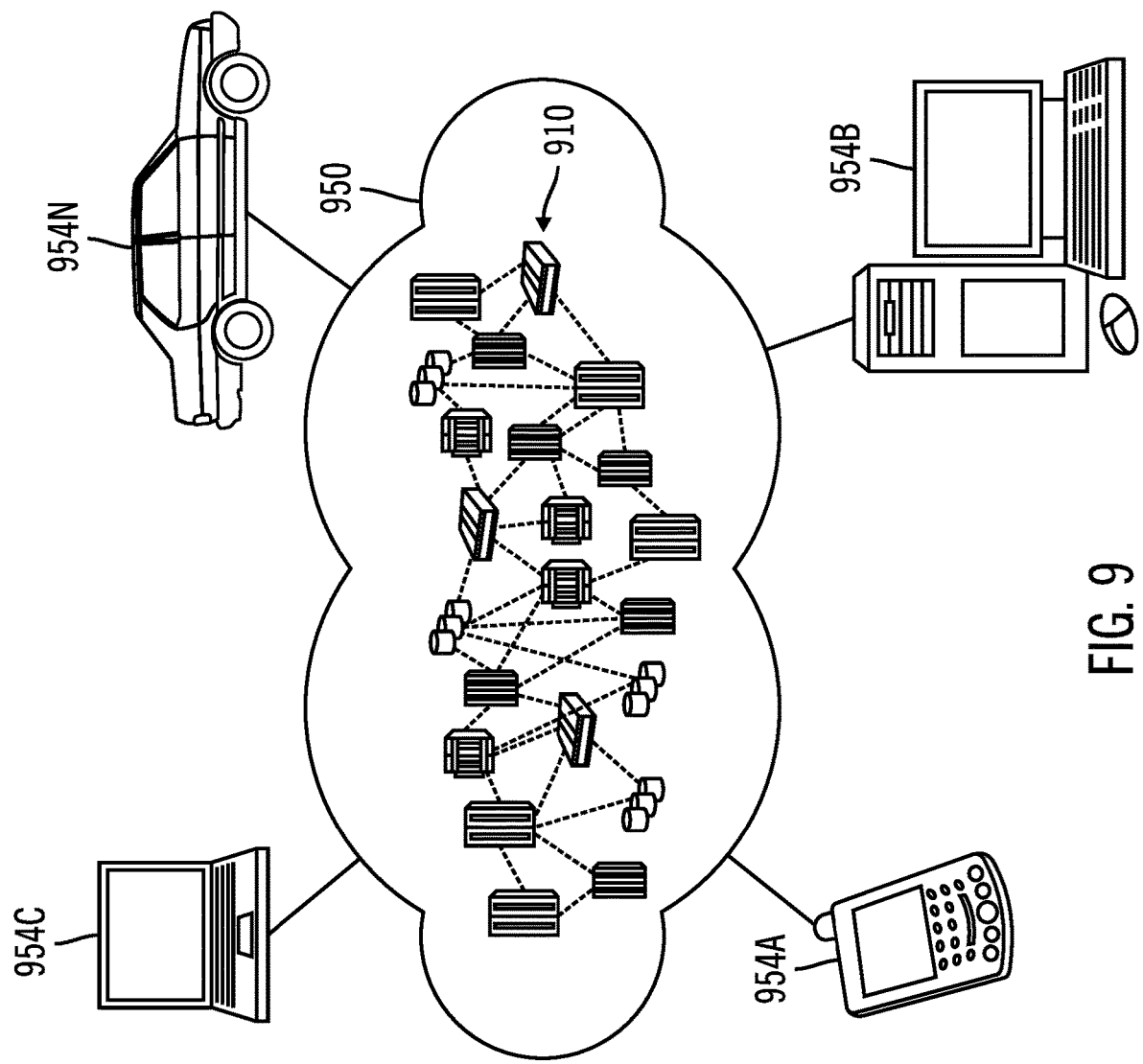
FIG. 9 illustrates a cloud computing environment in accordance with certain embodiments.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and OCR induction for multi-page changes 1096.

Thus, in certain embodiments, software or a program, implementing OCR induction for multi-page changes in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
   processing a plurality of documents of a document type to generate text area data for a text area in one or more documents of the plurality of documents, wherein the text area data includes coordinate locations of a zone for the text area based on expansion and direction of shift of the text area, and wherein the expansion is based on a font type and a font size of text values in the text area;
   training a page flow model using the plurality of documents and the text area data; and
   in response to receiving a new document comprising the text area,
      receiving a scanning script from the page flow model, wherein the page flow model identifies a new zone for the text area in the new document and determines how to adjust another zone for an element in the new document, and wherein the page flow model generates the scanning script to describe new coordinate locations of the new zone and the another zone in the new document; and
      using the scanning script to scan the new document to generate digital text.

2. The computer-implemented method of claim 1, further comprising operations for:
   generating a plurality of page flow models, wherein each of the page flow models is associated with a different document type, and wherein another document type of another document is used to select a corresponding page flow model of the plurality of page flow models.

3. The computer-implemented method of claim 1, wherein the page flow model further comprises:
   extracting text values for the text area in the new document;
   determining that the text values are accurate; and
   producing intermediate output that includes the new coordinate locations of the new zone for the text area, a label for the text area, and the text values for the text area.

4. The computer-implemented method of claim 3, wherein the page flow model further comprises:
   calculating a percentage of inaccuracy of the new zone and the another zone; and for the new zone and the another zone, adjusting a size of that zone until the percentage of inaccuracy for that zone is less than an inaccuracy threshold.

5. The computer-implemented method of claim 3, wherein the scanning script comprises, for the new zone, the new coordinate locations, the label, the text values, and an extraction confidence.

6. The computer-implemented method of claim 1, wherein a Software as a Service (SaaS) is configured to perform the operations of the computer-implemented method.

7. A computer program product, the computer program product comprising a computer readable storage medium having program code embodied therewith, the program code executable by at least one processor to perform operations for:
  processing a plurality of documents of a document type to generate text area data for a text area in one or more documents of the plurality of documents, wherein the text area data includes coordinate locations of a zone for the text area based on expansion and direction of shift of the text area, and wherein the expansion is based on a font type and a font size of text values in the text area;
  training a page flow model using the plurality of documents and the text area data; and
  in response to receiving a new document comprising the text area,
    receiving a scanning script from the page flow model, wherein the page flow model identifies a new zone for the text area in the new document and determines how to adjust another zone for an element in the new document, and wherein the page flow model generates the scanning script to describe new coordinate locations of the new zone and the another zone in the new document; and
    using the scanning script to scan the new document to generate digital text.

8. The computer program product of claim 7, wherein the program code is executable by the at least one processor to perform further operations for:
  generating a plurality of page flow models, wherein each of the page flow models is associated with a different document type, and wherein another document type of another document is used to select a corresponding page flow model of the plurality of page flow models.

9. The computer program product of claim 7, wherein the page flow model further comprises:
  extracting text values for the text area in the new document;
  determining that the text values are accurate; and
  producing intermediate output that includes the new coordinate locations of the new zone for the text area, a label for the text area, and the text values for the text area.

10. The computer program product of claim 9, wherein the page flow model further comprises:
  calculating a percentage of inaccuracy of the new zone and the another zone; and
  for the new zone and the another zone, adjusting a size of that zone until the percentage of inaccuracy for that zone is less than an inaccuracy threshold.

11. The computer program product of claim 9, wherein the scanning script comprises, for the new zone, the new coordinate locations, the label, the text values, and an extraction confidence.

12. The computer program product of claim 7, wherein a Software as a Service (SaaS) is configured to perform the operations of the computer program product.

13. A computer system, comprising:
  one or more processors, one or more computer-readable memories and one or more computer-readable, tangible storage devices; and
  program instructions, stored on at least one of the one or more computer-readable, tangible storage devices for execution by at least one of the one or more processors via at least one of the one or more computer-readable memories, to perform operations comprising:
    processing a plurality of documents of a document type to generate text area data for a text area in one or more documents of the plurality of documents, wherein the text area data includes coordinate locations of a zone for the text area based on expansion and direction of shift of the text area, and wherein the expansion is based on a font type and a font size of text values in the text area;
    training a page flow model using the plurality of documents and the text area data; and
    in response to receiving a new document comprising the text area,
      receiving a scanning script from the page flow model, wherein the page flow model identifies a new zone for the text area in the new document and determines how to adjust another zone for an element in the new document, and wherein the page flow model generates the scanning script to describe new coordinate locations of the new zone and the another zone in the new document; and
      using the scanning script to scan the new document to generate digital text.

14. The computer system of claim 13, to perform further operations comprising:
  generating a plurality of page flow models, wherein each of the page flow models is associated with a different document type, and wherein another document type of another document is used to select a corresponding page flow model of the plurality of page flow models.

15. The computer system of claim 13, wherein the page flow model further comprises:
  extracting text values for the text area in the new document;
  determining that the text values are accurate; and
  producing intermediate output that includes the new coordinate locations of the new zone for the text area, a label for the text area, and the text values for the text area.

16. The computer system of claim 15, wherein the page flow model further comprises:
  calculating a percentage of inaccuracy of the new zone and the another zone; and
  for the new zone and the another zone, adjusting a size of that zone until the percentage of inaccuracy for that zone is less than an inaccuracy threshold.

17. The computer system of claim 15, wherein the scanning script comprises, for the new zone, the new coordinate locations, the label, the text values, and an extraction confidence.

18. The computer system of claim 13, wherein a Software as a Service (SaaS) is configured to perform the operations of the computer system.

* * * * *